United States Patent

[11] 3,621,072

| [72] | Inventors | Yoshihiro Watanabe<br>Kobe;<br>Jiro Kobayashi, Ibaragi-shi; Yoshiki<br>Toyoshima, Niihama-shi; Tooru<br>Tokumaru, Takatsuki-shi; Masatosi Saito,<br>Takatsuki-shi, all of Japan |
|---|---|---|
| [21] | Appl. No. | 783,410 |
| [22] | Filed | Dec. 12, 1968 |
| [45] | Patented | Nov. 16, 1971 |
| [73] | Assignee | Sumitomo Chemical Company, Ltd.<br>Osaka, Japan |
| [32] | Priorities | Dec. 23, 1967 |
| [33] | | Japan |
| [31] | | 42/82803;<br>Jan. 23, 1968, Japan, No. 43/3901 May 5, 1968, 43/35391, May 27, 1968, 43/36254, Aug. 15, 1968, 43/58331 |

[54] PROCESS FOR PRODUCING ISOPRENE
10 Claims, No Drawings

| [52] | U.S. Cl. | 260/681,<br>260/680 E, 260/682 |
|---|---|---|
| [51] | Int. Cl. | C07c 11/18 |
| [50] | Field of Search | 260/681,<br>682, 680 E |

[56] References Cited

UNITED STATES PATENTS

| 2,619,511 | 11/1952 | Conrad | 260/681 |
|---|---|---|---|
| 3,082,272 | 3/1963 | Long | 260/682 |
| 3,270,080 | 8/1966 | Christmann | 260/680 |
| 3,374,284 | 3/1968 | Barclay et al. | 260/680 |

*Primary Examiner*—Paul M. Coughlan, Jr.
*Attorney*—Stevens, Davis, Miller & Mosher

ABSTRACT: Isoprene is synthesized in high yield according to simple procedures and at low costs by passing a mixed gas comprising isobutylene, methanol and/or methyl ether, and oxygen gas, over a solid catalyst maintained at 100°–500° C. which contains as a component one member selected from the group consisting of oxides of vanadium, tungsten, molybdenum, uranium and the like, and mixtures thereof.
When said catalyst is supported on a silica gel as a carrier, a high synergistic effect can be attained. If necessary, an acid, or an alkali or alkaline earth metal compound, may be used as a promotor.

PROCESS FOR PRODUCING ISOPRENE

This invention relates to a novel process for directly synthesizing isoprene on commercial scale by the catalytic gas phase reaction of a mixture comprising isobutylene, methanol and/or methyl ether, and oxygen.

For the commercial scale synthesis of isoprene, many processes have been proposed heretofore. Typical as such processes are, for example, (1) isobutylene-formaldehyde process, (2) ethylene-propylene process, (3) propylene dimerization process, (4) acetylene-acetone process, and (5) methylethylketone-formaldehyde process. The process (1) may be subdivided into a method in which isoprene is obtained from isobutylene and formaldehyde through dimethyl metadioxane, and a method in which isoprene is obtained directly from isobutylene and formaldehyde in the vapor phase in the presence of a catalyst. In the above-mentioned known processes, the yields at individual steps are relatively high. However, the processes have such drawbacks that since the number of steps is many, the overall yield is low and the costs for the construction of equipments are disadvantageously high, catalysts employed are short in life, dangerous catalysts are used in large amounts, starting materials are expensive or the processes involve markedly corrosive steps.

Isoprene is chiefly used as a starting material for production of synthetic rubbers, which is desired to be prepared in large quantities and at extremely low cost so as to be comparable to natural rubber.

An object of the present invention is to provide a process producing isoprene in extremely simplified procedures using starting materials obtainable at lowest costs and in large quantities.

Other objects of the invention will become apparent from the following description.

In order to accomplish these objects, the present invention provides a process for producing isoprene, which comprises contacting a mixed gas comprising isobutylene, methanol and/or methyl ether, and oxygen with a solid catalyst at 100°–500° C.

Isobutylene is byproduced in markedly large amount as a $C_4$ fraction of cracked petroleum gas, since cracker has become large in size in recent years. Accordingly, the cost of isobutylene employed is lower than that of ethylene or propylene, even when the extraction cost thereof is taken into consideration. Methanol has heretofore been one of the inexpensive organic chemicals, and will become more inexpensive by virtue of recent construction of large size synthesis apparatus. Methyl ether, which is usable as a starting material in place of or in combination with methanol, is byproduced in the synthesis of methanol, and has been used for a fuel or has been discarded as waste gas. As an oxygen source, air or isolated oxygen may be used in the presence or absence of an inert gas such as steam or carbon dioxide.

A first characteristic of the present isoprene synthesis process resides in that the starting materials employed are most inexpensive and are obtainable in large quantities. Further, according to the present process, isoprene can be directly obtained in high yield by merely passing a mixed gas comprising isobutylene, methanol and oxygen over a suitable catalyst under appropriate conditions, without previously converting methanol or methylether into formaldehyde. Accordingly, a second characteristic of the present process lies in that the process is most simple in procedure and is most economical, in view of the cost of apparatus, operation and construction, since no corrosive materials are used at all.

Thus, the present invention has made it possible to establish an entirely novel process for producing isoprene which has such various advantages as mentioned above. This is ascribable to the discovery of the specific catalysts set forth below. It is well known that, originally, both isobutylene and methanol are quite easily oxidizable organic compounds, and individually give methacrylic acid, formaldehyde and the like by partial oxidation. By use of the catalysts according to the present invention, however, it has become possible that competitive partial oxidation reaction and addition reaction are simultaneously effected, and isoprene can be synthesized in high yield with advantages.

As the result of many studies, the present inventors have found that effective catalysts usable in the present invention are those which contain, as at least one component, a compound comprising oxygen and one or more members selected from the group consisting of tungsten, vanadium, molybdenum, uranium, copper, iron and chromium. (Such catalysts will be referred to as "catalysts A," hereinafter). Examples of the catalyst (A) include tungsten (IV, VI) oxide vanadium (II, III, IV, V) oxide, molybdenum (IV, VI) oxide, uranium (IV, VI) oxide copper (I, II) oxide, iron (II, III) oxide, chromium (II, III) oxide and the like.

Starting materials for preparing catalyst (A) are those shown above or substances capable of being converted into the catalysts (A) by thermal decomposition, such as for example, ammonium heptamolybdate, molybdic acid, ammonium metavanadate, ammonium tungstate, uranyl nitrate and uranyl acetate.

In addition to said main components, promotors may be added in order to inhibit side reactions and to increase selectivity. For example, compounds of phosphorus, sulfur, boron, antimony, bismuth, tellurium, silver, barium, calcium, magnesium, potassium and sodium are effective for said purpose. (Catalysts incorporated with these promotors will be referred to as "catalysts B," hereinafter.) The proportions of the above-mentioned elements in the catalysts can be optionally selected, though said proportions are not irrelevant to conversion and selectivity.

These catalysts A and B may be used after shaping by compression, calcination and the like procedures, without using any carriers or in a state supported on carriers. As the carriers, molten or semimolten titanium oxide, zinc oxide, tellurium oxide, alumina and active carbon, pumice are ordinarily used. Especially a compound of silicon and oxygen (C) (such as silica gel) is preferable as the carrier. Among the above-mentioned catalysts (A), there are some which display marked isoprene-forming ability only when used in combination with the compound (C). Such synergistic effect is observed not only in the case where the catalysts (A, B) are supported on the compound of silicon and oxygen, but also in the case where the catalysts (A, B) and the compound (C) are individually finely divided and finely mixed together, and the mixture is compressed for use as a catalyst; and also in the case where a catalyst is prepared by gelling the catalysts (A, B) together with a silica sol in the form of a colloidal dispersion, followed by calcination.

There is a maximum value in isoprene yield depending on the mixing ratio of (A, B) to (C) in the catalyst employed, and the properties and kinds of the starting materials (A, B) and (C), and can be selected from the range of 1:99 to 99:1. Generally, a range of from 5:95 to 95:5 gives favorable results. For example, each catalysts comprising respectively, molybdenum trioxide and active alumina; vanadium pentoxide and titanium oxide; and molybdenum trioxide, phosphoric acid and molten alumina are low in activity, as shown in comparative examples 1 and 2, whereas each catalyst incorporated with silica are markedly high in activity as shown in examples 9, 10, 14 and 15.

In order to further enhance the above-mentioned effect, the present inventors studied the influence of the compound (C). As the result, the inventors have found that when silica gel is to be used as a starting material, the use of silica gel having a surface area of less than 350 m.$^2$/g. can greatly increase the isoprene selectivity.

It is well known, in general, that even in the case of substances comprising silicon and oxygen, the physical and chemical properties thereof are markedly complex, and that they delicately vary in surface area, average pore diameter, water content, intensities and kinds of acid sites, depending on differences in preparation conditions.

Especially the surface area of silica gel employed as a starting material has an important influence on isoprene selectivity, and use of a silica gel small in surface area is preferred.

Example 13 describes the cases where combinations of molybdenum oxide and silica gel are used. The same effects are observed also in the cases where combinations of other kinds of compounds (A, B) and silica gel are employed.

In the next place, the promotors employed in the present process will be explained.

In case the promotors are phosphorus compound the catalysts may be prepared, for example, either by mixing phosphomolybdic acid, vanadium phosphate or phosphotungstic acid with silica gel, or by mixing molybdenum trioxide and a suitable amount of phosphoric acid with silica gel. By addition of phosphorus or a compound of phosphorus and oxygen, the isoprene selectivity based on isobutylene and the amount of isoprene produced per unit volume, time of catalyst are increased, and the deposition of carbon on the catalyst surface is inhibited.

Sulfur or sulfur compounds also display substantially the same effect as that of phosphorus. In addition thereto, boron or a compound comprising boron and phosphorus, e.g. boron phosphate, shows substantially the same effect. In addition to such substances as phosphorus, sulfur and boron which give acidic properties, there may be used, as promotors, such substances which conversely give basic properties, e.g. compounds of alkali or alkaline earth metals such as sodium, potassium, calcium, barium and magnesium. These substances, when added in small amounts, have actions to increase the isoprene selectivity. Further, tellurium, antimony or bismuth, when incorporated in a small amount, displays an action to make catalyst activity extremely mild, and hence can be used as an activity controlling agent.

Reaction conditions adopted in the present invention will be illustrated hereunder. When represented by a thermal reaction equation, the isoprene synthesis process in accordance with the present invention is a markedly great exothermic reaction as set forth below.

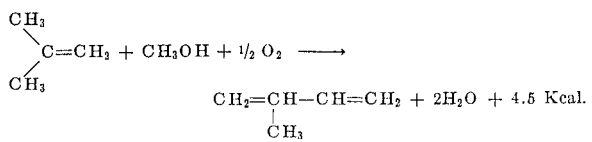

In order to smoothly progress the competitive partial oxidation reaction, therefore, the process should be effected under thoroughly examined conditions in temperature of catalyst bed, in starting gas composition and in contact time.

One of the most important matters with respect to the starting gas composition is to add to the reaction mixture gas a proper amount of steam as a diluent. By addition of a proper amount of steam, not only the yield of isoprene is increased but also the degradation of catalyst activity is minimized. In case the reaction has been effected without the addition of steam, methylbutenes are byproduced in slight amounts. When steam has been added, however, such byproducts are scarcely formed. This greatly facilitates the step for purification of isoprene.

The addition of steam not only has advantages of reaction yield as mentioned above, but also has many advantages in that the reaction temperature can be easily controlled and that the byproduct formaldehyde can be readily collected.

The amount of steam added is not entirely irrelevant to the yield of isoprene, but can be selected from a wide range. The amount of steam in the reaction gas is 3–80 percent, preferably 10–50 percent, by volume.

For the removal of steam from the reaction product gas, no particular operation is necessary, since the steam is separated as a condensate by merely cooling the gas to about normal temperature. This condensate chiefly contains unreacted methanol and byproduced formaldehyde, and scarcely contains isoprene and isobutylene.

In carrying out the process of the present invention, there are two methods.

One method is carried out in such a manner that the reaction is effected under such conditions as to byproduce a large amount of formaldehyde to produce formalin together with isoprene. In this case, the resulting condensate contains methanol in admixture with formaldehyde. This is preferable from the standpoint of stability of formaldehyde. If the reaction conditions are suitable selected, the conversion of methanol into isoprene and formaldehyde can be made extremely high.

Another method is carried out in such a manner that the condensate containing formaldehyde and unreacted methanol is vaporized and is recycled to the reactor after freshly supplementing methanol thereto. What is quite interesting in the above case is that the catalyst in accordance with the present invention is markedly high in activity to combine formaldehyde with isobutylene thereby converting them into isoprene. Accordingly, there is no such case where formaldehyde is accumulated by said recycle. Which method is to be adopted is entirely optional, and is decided by economical viewpoint.

The mixing ratio of isobutylene, methanol and oxygen is closely related to the yields of isoprene and formaldehyde, and is quite an important operational factor. When the process is carried out in commercial scale, it is desirable that consideration be taken so as to avoid the use of an explosive composition. The reaction temperature varies depending on the kind of catalyst employed and the composition of starting gas. If the temperature is excessively low, the reaction rate becomes insufficient, while if the temperature is excessively high, the decomposition of methanol is enhanced and the isoprene selectivity is lowered. Generally, the adoption of a temperature of 100°–500° C., particularly 200°–400° C., is advantageous.

The apparent contact time employed in the present process can be selected from such a markedly wide range as from 0.1 to 100 seconds. In general, there is such a tendency that in case the contact time is short, the amount of formaldehyde formed is large, while in case the contact time is made longer, the amount of formaldehyde formed is decreased and the amount of isoprene produced is increased. However, if the contact time is too long, the amount of unreacted methanol is decreased due to the decomposition of methanol. It is therefore extremely important to select a suitable contact time. Generally, a contact time of about 0.5–30 seconds gives favorable results.

The process of the present invention may be effected either under pressure or under reduced pressure.

In practicing the present process, any apparatus suitable for effecting a gas phase oxidation reaction may be used, in general.

Since the present reaction is a markedly great exothermic reaction, it is necessary that, in designing the reaction apparatus, sufficient consideration should be paid to the removal of reaction heat. When the reaction is carried out by use of a fixed bed-type or moving bed-type reactor in which a shaped catalyst is employed, it is possible to adopt any known cooling process using air, a salt bath, pressurized water, a heat transfer medium or the like. In view of various characteristics of the present process, however, the use of a fluidized bed-type reactor is desirable.

The reaction product can be recovered according to any of known methods. The reaction product contains, in addition to isoprene, steam, unreacted methanol, formaldehyde, dimethyl ether, unreacted isobutylene and small amounts of CO and $CO_2$, which are decomposition products of methanol. Methods for treatment of steam, unreacted methanol and byproduced formaldehyde are as mentioned previously. For the collection of isoprene, there is employed a suitable method, e.g. a method in which isoprene is liquefied by means of a condenser, or a method in which isoprene is absorbed by use of a solvent.

One of the advantages of the present process is that byproducts, particularly methyl butenes close in boiling point, are formed in markedly small amounts. Crude isoprene may be purified, according to an ordinary process, to such an extent as to be usable as a starting material for synthetic polyisoprene. The gas after separation of isoprene which is composed mainly of isobutylene may be recycled as it is, i.e. in a mixed state.

The present invention will be illustrated below with reference to examples. However, it is not intended to limit the invention to the examples.

In each of examples 9–15 1and 18–22 and comparative examples 1–3, the conversions based individually on isobutylene, methanol and methyl ether, and the selectivities for isoprene are calculated according to the following equations:

Isobutylene conversion (%)

$$= \frac{(\text{Moles of fed isobutylene}) - (\text{Moles of recovered isobutylene})}{(\text{Moles of fed isobutylene})} \times 100$$

Methanol conversion (%)

$$= \frac{(\text{Moles of fed methanol}) - (\text{Moles of recovered methanol})}{(\text{Moles of fed methanol})} \times 100$$

Methyl ether conversion (%)

$$= \frac{(\text{Moles of fed methyl ether}) - (\text{Moles of recovered methyl ether})}{(\text{Moles of fed methyl ether})} \times 100$$

Isoprene selectivities (%):
Based on isobutylene $$= \frac{(\text{Moles of isoprene produced})}{(\text{Moles of fed isobutylene}) - (\text{Moles of recovered isobutylene})} \times 100$$

Based on methanol $$= \frac{(\text{Moles of isoprene produced})}{(\text{Moles of fed methanol}) - (\text{Moles of recovered methanol})} \times 100$$

Based on methyl ether $$= \frac{(\text{Moles of isoprene produced})}{2 \times \{(\text{Moles of fed methyl ether}) - (\text{Moles of recovered methyl ether})\}} \times 100$$

EXAMPLE 1

A tungsten trioxide powder was press-shaped by means of a pelletizer, was calcined at 500° C. for 8 hours, and was then ground to 12–16 mesh grains to prepare a catalyst.

On the other hand, isobutylene (a commercially available product; purity: 98.5 percent) was passed at a flow rate of 60 ml. per minute (NTP) through methanol maintained at 40° C. to form a methanol vapor-saturated gas mixture comprising isobutylene and methanol in a ratio of about 2:1. The gas mixture was mixed in a gas mixer with 50 ml. per minute (NTP) of air, and was then introduced for 1 hour at about atmospheric pressure into a quartz-made reaction tube kept at 300° C. which had been packed with 15 ml. of the catalyst prepared in the aforesaid manner. A reacted gas was passed to a trap maintained at −70° C., and the resulting liquid condensate and noncondensate were individually subjected to measurement and to quantitative analysis by means of gas chromatography to calculate the amounts of reaction products and unreacted materials. The results are as shown below.

Amount of isoprene formed     0.57 g.
Amount of methyl butenes formed   0.02 g.
Amount of isobutylene recovered   7.61 g.
Amount of methanol recovered     0.62 g.

EXAMPLE 2

Ammonium metavanadate was thermally decomposed at 600° C. for 5 hours. The resulting vanadium pentoxide powder was press-shaped together with a small amount of water, was dried at 100° C. for 3 hours, and was then ground to 12–16-mesh grains to prepare a catalyst. Using 15 ml. of the thus prepared catalyst, reaction was effected under the same reaction conditions as in example 1, except that the reaction temperature was varied to 255° C. The results are as shown below.

Amount of isoprene formed     0.24 g.
Amount of methyl butenes formed   0.01 g.
Amount of isobutylene recovered   7.58 g.
Amount of methanol recovered     0.71 g.

EXAMPLE 3

75 g. of antimony was dissolved in 350 ml. of concentrated nitric acid, and the solution was continuously heated until the generation of nitrogen oxide had completely ceased. To this solution was added a solution of 41 g. of uranyl acetate [$UO_2(C_2H_3O_2)_2 \cdot 2H_2O$] in 400 ml. of water. Subsequently, concentrated ammonia solution was added to the solution to deposit a precipitate. The precipitate was recovered by filtration, was thoroughly washed with distilled water and was then dried at 100° C. for 10 hours. Thereafter, the precipitate was calcined at 700° C. for 5 hours and was then ground to 12–16-mesh grains to prepare a catalyst. Using 15 ml. of the thus prepared catalyst, reaction was effected under the same reaction conditions as in example 1, except that the reaction temperature was varied to 270° C. The results are as shown below.

EXAMPLE 4

Amount of isoprene formed    0.05 g.
Amount of isobutylene recovered   7.85 g.
Amount of methanol recovered    1.91 g.

EXAMPLE 4

Silica Gel N–608 (a product of Nikki Kagaku K. K.) was ground to 12–16-mesh grains, and was subjected to heat treatment at 700° C. for 6 hours. 40 g. of the thus treated silica gel was mixed with 4 g. of copper oxide (II) together with a small amount of water, was dried at 100° C., and was then calcined at 400° C. for 8 hours to prepare a catalyst. Using 15 ml. of the thus prepared catalyst, reaction was effected under entirely the same reaction conditions as in example 1. The results are as shown below.

Amount of isoprene formed    0.16 g.
Amount of isobutylene recovered   8.19 g.
Amount of methanol recovered    1.70 g.

EXAMPLE 5

In similar way as in example 4, except that 5 g. of ferric oxide was used a catalyst was prepared. Using 15 ml. of the thus prepared catalyst, reaction was effected under entirely the same reaction conditions as in example 1. The results are as shown below.

Amount of isoprene formed    0.13 g.
Amount of isobutylene recovered   8.28 g.
Amount of methanol recovered    1.83 g.

EXAMPLE 6

In similar way as in example 4, except that 5 g. of chromium oxide (III) was used, a catalyst was prepared. Using 15 ml. of the thus prepared catalyst, reaction was effected under entirely the same reaction conditions as in example 1. The results are as shown below.

Amount of isoprene formed    0.23 g.
Amount of isobutylene recovered   8.15 g.
Amount of methanol recovered    1.63 g.

EXAMPLE 7

To 150 g. of a silica sol (Snowtex–N, a product of Nissan Kagaku K. K.; $SiO_2$ content: 20 percent) was added a solution of 6 g. of ammonium paratungstate in 150 g. of water. The mixture was stirred by means of a mixer and was vaporized to dryness over a water bath. Subsequently, the mixture was thoroughly kneaded with 1.5 g. of tellurium dioxide, was dried at 100° C., was calcined at 600° C. for 5 hours and was then ground to 12–16-mesh grains to prepare a catalyst.

On the other hand, 60 ml. per minute (NTP) of isobutylene (a commercially available product; purity: 98.5 percent), 15 ml. per minute (NTP) of methyl ether (a commercially available product; purity: 99.5 percent), and 50 ml. per minute (NTP) of air were mixed together by means of a gas mixer. The gas mixture was introduced for 1 hour at about normal pressure into a quartz-made reaction tube kept at 320° C. which had been packed with 15 ml. of the catalyst prepared in the aforesaid manner. A reacted gas was subjected to the same measurement and quantitative analysis as in example 1 to obtain the results shown below.

| | |
|---|---|
| Amount of isoprene formed | 0.59 g. |
| Amount of methyl butenes formed | 0.03 g. |
| Amount of isobutylene recovered | 7.60 g. |
| Amount of methyl ether recovered | 0.29 g. |

EXAMPLE 8

A solution of 7 g. of uranyl nitrate [$UO_2(NO_3)_2 \cdot 6H_2O$] in about 50 ml. of water, was added to 150 g. of a silica sol (Snowtex, a product of Nissan Kagaku K. K.; $SiO_2$ content: 30 percent). The mixture was thoroughly stirred by means of a mixer, was vaporized to dryness over a water bath, was calcined at 600° C. for 5 hours and was then ground to 12–16-mesh grains to prepare a catalyst. Using 15 ml. of the thus prepared catalyst, reaction was effected in the same manner as in example 7, except that the reaction temperature was varied to 300° C. The results were as shown below.

| | |
|---|---|
| Amount of isoprene formed | 0.22 g. |
| Amount of isobutylene recovered | 8.29 g. |
| Amount of dimethyl ether recovered | 0.39 g. |

EXAMPLE 9

Molybdenum trioxide, vanadium pentoxide, uranium trioxide, tungsten trioxide and Silica Catalyst N–608 (a product of Nikki Kagaku K. K.) were respectively ground to a size finer than 100 mesh. Each metal oxides were thoroughly mixed with the silica catalyst in the proportions shown in table 1, together with a small amount of water. Each mixture was press-shaped by means of a pelletizer, was dried at 100° C. for 4 hours, was calcined at 400° C., for 8 hours and was then ground to 12–16-mesh grains to prepare a catalyst.

On the other hand, isobutylene (a commercially available product; purity: 98.5 percent) was passed at a flow rate of 60 ml. per minute (NTP) through methanol maintained at 40° C. to form a methanol vapor-saturated gas mixture comprising isobutylene and methanol in a ratio of about 2:1. The gas mixture was mixed in a gas mixture with 50 ml. per minute (NTP) of air, and was then introduced at about atmospheric pressure into a quartz-made reaction tube kept at a temperature shown in table 1 which had been packed with 15 ml. of the catalyst prepared in the aforesaid manner. A reacted gas was passed to a trap maintained at −70° C., and the resulting liquid condensate and noncondensate were individually subjected to measurement and quantitative analysis by means of gas chromatography to calculate the amounts of reaction products and unreacted materials. The results were as shown in table 1.

EXAMPLE 10

Molybdic acid ($H_2MoO_4 \cdot H_2O$) was thoroughly mixed with a silica sol (Snowtex–N, a product of Nissan Kagaku K. K.; $SiO_2$ content: 20 percent) in the proportions shown in table 1. The mixture was vaporized to dryness with thorough stirring for about 10 hours, was calcined at 400° C. for 8 hours, and was then ground to 12–16-mesh grains to prepare a catalyst. Using 15 ml. of the thus prepared catalyst, reaction was effected in the same manner as in example 9 to obtain the results as shown in table 1. The metal oxide content in the catalyst was calculated as the form of molybdenum trioxide and $SiO_2$.

EXAMPLE 11

20 g. of Silica catalyst N–608 (a product of Nikki Kagaku K. K.) which has been ground to 1216-mesh grains, was immersed in a solution of 12.28 g. of ammonium heptamolybdate [($NH_4)_6Mo_7O_{24} \cdot 4H_2O$] in 20 ml. of water. After absorbing a major proportion of the solution, the silica catalyst was dried at 100° C. for 4 hours and was calcined at 500° C. for 8 hours to prepare a catalyst. Using 15 ml. of the thus prepared catalyst, reaction was effected in the same manner as in example 9 to obtain the results shown in table 1. The metal oxide content in the catalyst was calculated into the amount of molybdenum trioxide.

EXAMPLE 12

12.5 g. of molybdic acid ($H_2MoO_4 \cdot H_2O$) and 20 g. of Silica gel 90–A (a product of Dokai Kagaku K. K.) were individually ground to a size finer than 100 mesh. The two ground materials were thoroughly mixed each other, together with a small amount of water. The mixture was press-shaped by means of a pelletizer, was dried at 100° C. for 4 hours, was calcined at 500° C. for 5 hours, and was then ground to 12–16-mesh grains to prepare a catalyst.

On the other hand, 60 ml. per minute (NTP) of isobutylene (a commercially available product; purity: 98.5 percent), 15 ml. per minute (NTP) of dimethyl ether (a commercially available product; purity: 99.5 percent), and 50 ml. per minute of air were mixed together by use of a gas mixer. Subsequently, the mixed gas was introduced at about atmospheric pressure into a quartz-made reaction tube maintained at 300° C. which had been packed with 15 ml. of the catalyst prepared in the aforesaid manner. A reacted gas was subjected to the same measurement and quantitative analysis as in example 9 to obtain the results as shown below.

| | |
|---|---|
| Isobutylene conversion | 13.3 percent |
| Methyl ether conversion | 81.5 percent |
| Isoprene selectivities: | |
| Based on isobutylene | 65.2 percent |
| Based on methyl ether | 21.3 percent |

COMPARATIVE EXAMPLE 1

Molybdenum trioxide and Active Alumina KAT–6 (a product of Sumitomo Kagaku Kogyo K. K.) were individually ground to a size finer than 100 mesh. The two ground materials were thoroughly mixed each other in the proportions shown in table 1, together with a small amount of water. The mixture was press-shaped by means of a pelletizer, was dried at 100° C. for 4 hours and was calcined at 400° C. for 8 hours to prepare a catalyst. Using 15 ml. of the thus prepared catalyst, reaction was effected in the same manner as in example 9 to obtain the results as shown in table 1.

COMPARATIVE EXAMPLE 2

Vanadium pentoxide and titanium dioxide were individually ground to a size finer than 100 mesh. The two ground materials were thoroughly mixed each other in the proportions shown in table 1, together with a small amount of water. The mixture was press-shaped by means of a pelletizer, was dried at 100° C. for 4 hours, was calcined at 400° C. for 8 hours and was then ground to a size of 12–16-mesh to prepare a catalyst. Using 15 ml. of the thus prepared catalyst, reaction was effected in the same manner as in example 9 to obtain the results as shown in table 1.

TABLE 1

| Catalyst | | Metal oxide content in catalyst, wt. percent | Reaction temp., °C. | Percent | | Isoprene selectivity | |
|---|---|---|---|---|---|---|---|
| | | | | Isobutylene conversion | Methanol conversion | Based on isobutylene | Based on methanol |
| Example 9 | $MoO_3$-$SiO_2$ | 1.0 | 250 | 5.6 | 7.1 | 6.0 | 9.5 |
| | $MoO_3$-$SiO_2$ | 16.7 | 250 | 11.6 | 41.1 | 35.1 | 19.9 |
| | $MoO_3$-$SiO_2$ | 33.3 | 250 | 11.0 | 34.8 | 47.7 | 30.1 |
| | $MoO_3$-$SiO_2$ | 50.0 | 250 | 11.8 | 33.8 | 32.1 | 22.7 |
| | $MoO_3$-$SiO_2$ | 90.0 | 250 | 13.0 | 20.1 | 20.6 | 26.7 |
| | $V_2O_5$-$SiO_2$ | 4.8 | 250 | 10.5 | 20.4 | 28.2 | 29.0 |
| | $V_2O_5$-$SiO_2$ | 33.3 | 250 | 12.8 | 38.1 | 48.1 | 32.3 |
| | $V_2O_5$-$SiO_2$ | 50.0 | 250 | 10.1 | 31.8 | 41.9 | 26.7 |
| | $UO_3$-$SiO_2$ | 10.0 | 300 | 10.0 | 30.5 | 26.3 | 17.2 |
| | $UO_3$-$SiO_2$ | 33.3 | 300 | 12.1 | 40.4 | 32.9 | 19.7 |
| | $UO_3$-$SiO_2$ | 50.0 | 300 | 10.0 | 48.7 | 19.2 | 7.9 |
| | $WO_3$-$SiO_2$ | 33.3 | 300 | 6.1 | 30.8 | 55.8 | 22.2 |
| Example 10 | $H_2MoO_4 \cdot H_2O$-$SiO_2$ sol | 16.7 | 250 | 17.0 | 47.4 | 12.5 | 9.0 |
| | $H_2MoO_4 \cdot H_2O$-$SiO_2$ sol | 33.3 | 250 | 17.9 | 41.9 | 18.4 | 15.7 |
| | $H_2MoO_4 \cdot H_2O$-$SiO_2$ sol | 50.0 | 250 | 16.0 | 51.2 | 55.5 | 34.7 |
| | $H_2MoO_4 \cdot H_2O$-$SiO_2$ sol | 80.0 | 250 | 8.3 | 37.3 | 53.9 | 23.9 |
| Example 11 | $(NH_4)_6Mo_7O_{24} \cdot 4H_2O$-$SiO_2$ | 33.3 | 250 | 11.7 | 34.9 | 39.4 | 26.4 |
| Comparative Example 1 | $MoO_3$-$Al_2O_3$ | 16.7 | 250 | 13.3 | 87.7 | 12.5 | 3.8 |
| | $MoO_3$-$Al_2O_3$ | 50.0 | 250 | 14.1 | 85.1 | 13.6 | 4.5 |
| Comparative Example 2 | $V_2O_5$-$TiO_2$ | 16.7 | 250 | 8.7 | 67.4 | 37.2 | 9.6 |
| | $V_2O_5$-$TiO_2$ | 50.0 | 250 | 11.8 | 70.5 | 35.2 | 11.8 |

EXAMPLE 13

Various silica gel catalysts were individually ground to a size finer than 100 mesh, and were mixed with molybdic acid ($H_2MoO_4 \cdot H_2O$) together with a small amount of water. Each mixture was dried at 100° C. for 4 hours, was ground to a size of 7–12-mesh, was charged into a oven, and was then calcined at 400° C. for 3 hours in a nitrogen atmosphere to prepare a catalyst. The catalyst contained 33 percent of $H_2MoO_4 \cdot H_2O$ calculated for $MoO_3$, and the remainder components were silica gel and a more or less amount of water. 15 ml. of the thus prepared catalyst was charged into a quartz-made reaction tube having an inner diameter of 18 mm., and was maintained at 250° C. by means of an electric furnace. Over the catalyst, 60 ml. per minute of isobutylene, 30 ml. per minute of methanol vapor, and 10 ml. per minute of oxygen (provided that since air was used as the oxygen source, nitrogen was included in about 4 times the amount of oxygen) were passed. The product was determined by means of gas chromatography. The reaction product was composed mainly of isoprene and unreacted isobutylene, methanol, and contained a small amount of formaldehyde. As byproducts, methyl butenes are formed in such small amounts as to be barely detectable according to gas chromatographycal analysis. Relationship between the surface area of the silica gel used as starting material and the isoprene selectivity was as shown in table 2. The surface area of silica gel was measured according to B.E.T. method.

TABLE 2

| | Surface area of starting silica gel, m.²/g. | Percent | |
|---|---|---|---|
| | | Methanol conversion | Isoprene selectivity based on methanol |
| 1 | 150 | 35.9 | 32.2 |
| 2 | 249 | 35.4 | 28.3 |
| 3 | 300 | 46.6 | 19.0 |
| 4 | 453 | 43.4 | 9.7 |
| 5 | 720 | 41.9 | 9.6 |

EXAMPLE 14

Molybdenum trioxide and Silica Catalyst N–608 (a product of Nikki Kagaku K. K.) were individually ground to a size finer than 100 mesh. 20 g. of the molybdenum trioxide and 40 g. of the silica catalyst were thoroughly mixed together with 40 ml. of an aqueous phosphoric acid solution. The mixture was vaporized to dryness over a water bath, was calcined at 400° C. for 8 hours, and was then ground to 12–16-mesh grains to prepare a catalyst. The atomic ratio of molybdenum to phosphorus in the catalyst is as shown in table 3. Using 15 ml. of the thus prepared catalyst, reaction was effected in the same manner as in example 9 to obtain the results set forth in table 3. The amount of carbon deposited on the catalyst was smaller than in the case of example 9.

EXAMPLE 15

To 40 g. of Silica Gel 90–A (a product of Dokai Kagaku K. K.), which had been ground to 12–16-mesh grains, was added a solution of 20 g. of phosphomolybdic acid in 25 g. of water to absorb the solution in the silica gel, and excess water was vaporized. The thus treated silica gel was dried at 100° C. for 4 hours, and was calcined at 400° C. for 8 hours to prepare a catalyst. Using 15 ml. of the thus prepared catalyst, reaction was effected in the same manner as in example 9 to obtain the results as shown in table 3. The amount of carbon deposited on the catalyst was smaller than in the case of example 9.

COMPARATIVE EXAMPLE 3

40 g. of alumina for catalyst carrier (a product of Norton Co.), which had been ground to 12–16-mesh grains, was mixed with 20 g. of molybdenum oxide, which had been obtained by thermally decomposing of ammonium heptamolybdate at 500° C. for 5 hours. The mixture was stirred together with 15 g. of an aqueous phosphoric acid solution (phosphoric acid content: 15 percent), while vaporizing water by use of hot air. Subsequently, the mixture was dried at 100° C. for 4 hours and was calcined at 400° C. for 8 hours to prepare a catalyst. Using 15 ml. of the thus prepared catalyst, reaction was effected in the same manner as in example 9 to obtain the results as shown in table 3.

TABLE 3

| Catalyst | | P/MO | Reaction temp., °C. | Percent | | | |
|---|---|---|---|---|---|---|---|
| | | | | Conversion | | Isoprene selectivity | |
| | | | | Isobutylene | Methanol | Based on isobutylene | Based on methanol |
| Example 14 | $H_3PO_4$-$MoO_3$-$SiO_2$ | 0.05 | 250 | 12.6 | 49.4 | 54.9 | 28.0 |
| | $H_3PO_4$-$MoO_3$-$SiO_2$ | 0.2 | 250 | 14.2 | 57.2 | 62.4 | 26.4 |
| | $H_3PO_4$-$MoO_3$-$SiO_2$ | 0.5 | 250 | 11.5 | 55.4 | 70.3 | 29.2 |
| | $H_3PO_4$-$MoO_3$-$SiO_2$ | 0.7 | 250 | 6.1 | 46.0 | 51.3 | 13.6 |
| | $H_3PO_4$-$MoO_3$-$SiO_2$ | 1.0 | 250 | 3.7 | 35.2 | 44.3 | 9.3 |
| Example 15 | Phosphomolybdic acid-$SiO_2$ | | 250 | 13.2 | 50.7 | 54.7 | 28.5 |
| Comparative Example 3 | $H_3PO_4$-$MoO_3$-$Al_2O_3$ | | 250 | 2.2 | 9.0 | 10.4 | 5.1 |

P/MO = (number of phosphorus atoms in the catalyst)/(number of molybdenum atoms in the catalyst).

EXAMPLE 16

Vanadyl sulfate ($VOSO_4 \cdot 2H_2O$) and electrofused alumina (produced by Norton Co.) were individually ground to a size finer than 100 mesh. 40 g. of the ground alumina was thoroughly mixed with 20 g. of the ground vanadyl sulfate together with a small amount of water. The mixture was press-shaped by means of a pelletizer, was dried at 100° C. for 4 hours, was calcined at 400° C. for 8 hours, and was then ground to 12–16-mesh grains to prepare a catalyst. Using 15 ml. of the thus prepared catalyst, reaction was effected in the same manner as in example 1 to obtain the results as shown below:

Amount of isoprene formed      0.28 g.
Amount of isobutylene recovered    7.56 g.
Amount of methanol recovered    1.13 g.

EXAMPLE 17

Molybdenum disulfide and Silica Gel 90-A (a product of Dokai Kagaku K. K.) were individually ground to a size finer than 100 mesh. 22.4 g. of the ground molybdenum disulfide were thoroughly mixed with 40 g. of the ground silica gel together with a small amount of water. The mixture was press-shaped by means of a pelletizer, was dried at 100° C. for 4 hours, was calcined at 500° C. for 8 hours in a nitrogen atmosphere, and was then ground to 12–16-mesh grains to prepare a catalyst. Using 15 ml. of the thus prepared catalyst, reaction was effected in the same manner as in example 1, except that the reaction temperature was varied to 290° C. The results were as shown below.

Amount of isoprene formed      0.53 g.
Amount of isobutylene recovered    7.39 g.
Amount of methanol recovered    1.23 g.

EXAMPLE 18

Molybdenum trioxide and Silica Catalyst N–608 (a product of Nikki Kagaku K. K.) were individually ground to a size finer than 100 mesh. 1 part by weight of the ground molybdenum trioxide was thoroughly mixed with 2 parts by weight of the ground silica catalyst together with a small amount of water. Subsequently, the mixture was press-shaped into tablets, was calcined at 400° C. for 8 hours, and was then ground to 12–16-mesh grains to prepare a catalyst. 15 ml. of the thus prepared catalyst was charged into each of two quartz-made reaction tubes of 15 mm. in inner diameter. Thereafter, mixed gases of the compositions A and B shown in table 4 were individually introduced into the reaction tubes, and were reacted at 250° C. and at about atmospheric pressure with a contact time of 4 seconds. Gases formed were individually passed to a trap maintained at −70° C., and the resulting liquid condensates and noncondensates were individually subjected to measurement and analysis by means of gas chromatography to calculate the amounts of reaction products and unreacted materials. The results were as shown in table 4.

TABLE 4

| | A | B |
|---|---|---|
| Feed gas composition (vol.%): | | |
| Isobutylene | 44 | 36 |
| Methanol | 22 | 18 |
| Air | 34 | 23 |
| Steam | 0 | 23 |
| Isobutylene conversion (%) | 11.0 | 9.8 |
| Methanol conversion (%) | 34.8 | 30.2 |
| Isoprene selectivity (%): | | |
| Based on isobutylene | 47.4 | 58.6 |
| Based on methanol | 30.1 | 38.0 |

EXAMPLE 19

60 parts by weight of water was charged with 1.5 parts by weight of phosphoric acid, 23 parts by weight of molybdenum trioxide, 6 parts by weight of concentrated nitric acid and 58 parts by weight of bismuth nitrate [$Bi(NO_3)_3 \cdot 5H_2O$)], and the mixture was thoroughly stirred to form a solution. This solution was added to 80 parts by weight of a silica sol (Snowtex produced by Nissan Kagaku K. K.; $SiO_2$ content: 32 percent.) The mixture was stirred by means of a mixer, was vaporized to dryness over a water bath, was calcined at 600° C. for 5 hours, and was then ground to 12–16-mesh grains to prepare a catalyst. 15 ml. of the thus prepared catalyst was charged into each of two quartz-made reaction tubes of 15 mm. in inner diameter. Thereafter, mixed gases of the compositions C and D shown in table 5 were individually introduced into the reaction tubes, and were reacted at 270° C. and at about atmospheric pressure for a long period with a contact time of 6 seconds to observe the effect of addition of steam on the activity of catalyst. Gases formed were analyzed in the same manner as in example 18 to obtain the results as shown in table 5.

TABLE 5

| | C | | | D | | |
|---|---|---|---|---|---|---|
| Feed gas composition (vol. percent) | Isobutylene, 44%; methanol, 21%, air, 34%. | | | Isobutylene, 42%; methanol, 21%; oxygen, 7%; steam, 30%. | | |
| Elapsed reaction time (hours) | 1 | 5 | 10 | 1 | 5 | 10 |
| Isobutylene conversion (percent) | 17.0 | 18.1 | 18.5 | 14.1 | 14.2 | 14.9 |
| Methanol conversion (percent) | 45.7 | 46.6 | 48.0 | 39.2 | 40.5 | 39.5 |
| Isoprene selectivity (percent): | | | | | | |
| Based on isobutylene | 43.7 | 38.6 | 35.4 | 62.0 | 64.5 | 58.1 |
| Based on methanol | 32.5 | 30.0 | 27.3 | 44.6 | 45.3 | 43.8 |

EXAMPLE 20

20 ml. of the same catalyst as used in example 19 was charged into a stainless steel-made, U-shaped reaction tube, and was heated to 290° C. Into this catalyst bed, a starting gas comprising, by volume, 50 percent of isobutylene, 13 percent of methanol, 5 percent of oxygen and 32 percent of steam was introduced at about atmospheric pressure with a contact time of 3 seconds. A gas formed was analyzed in the same manner as in example 1 to obtain the following results:

| | |
|---|---|
| Isobutylene conversion | 8.1 percent |
| Methanol conversion | 33.0 percent |
| Isoprene selectivities: | |
| Based on isobutylene | 64.1 percent |
| Based on methanol | 60.2 percent |

In addition, formaldehyde was byproduced in an amount of 19.2 percent based on the reacted methanol. Thus, 79.4 percent of the reacted methanol was converted to the effective compounds isoprene and formaldehyde.

EXAMPLE 21

6 parts by weight of concentrated nitric acid and 58 parts by weight of bismuth nitrate [$Bi(NO_3)_3 \cdot 5H_2O$] were dissolved in 60 parts by weight of water. To this solution were added 1.5 parts by weight of phosphoric acid, 23 parts by weight of molybdenum trioxide and 5 parts by weight of calcium hydroxide and the mixture was thoroughly stirred. To the mixture was further added 80 parts by weight of a silica sol (Snowtex produced by Nissan Kagaku K. K.; $SiO_2$ content: 32 percent). Subsequently, the mixture was stirred by means of a mixer, was vaporized to dryness, was calcined at 480° C. for 5 hours, and was then ground to 12–16-mesh grains to prepare a catalyst. Using 20 ml. of the thus prepared catalyst, reaction was effected under the same reaction conditions as in example 20, except that the salt bath temperature was varied to 300° C. The results were as follows:

| | |
|---|---|
| Isobutylene conversion | 6.3 percent |
| Methanol conversion | 36.1 percent |
| Isoprene selectivities: | |
| Based on isobutylene | 82.2 percent |
| Based on methanol | 61.5 percent |

In addition, formaldehyde was byproduced in an amount of 20.5 percent based on the reacted methanol. Thus, 82.0 percent of the reacted methanol was converted to the effective compounds isoprene and formaldehyde.

EXAMPLE 22

1.5 parts by weight of phosphoric acid, 23 parts by weight of molybdenum trioxide, 6 parts by weight of concentrated nitric acid and 58 parts by weight of bismuth nitrate [$Bi(NO_3)_3 \cdot 5H_2O$] were dissolved in 60 parts by weight of water. To this solution, 80 parts by weight of a silica sol (Snowtex, a product of Nissan Kagaku K. K.; $SiO_2$ content: 32 percent) was added, and the mixture was stirred and was then countercurrently spray-dried by use of hot air at 650° C. to prepare a catalyst. 100 ml. of the thus prepared catalyst was charged into a two-stage fluidized reactor having a lower chamber of 35 mm. in inner diameter and 100 in height, and an upper chamber of 50 mm. in inner diameter and 100 mm. in height. The reactor had been made of quartz, except that only a gas-jetting nozzle at the bottom and a catalyst-receiving plate of the upper chamber had been made of stainless steel. Into this reactor, a gas mixture comprising 880 ml. per minute of isobutylene, 187 ml. per minute of methanol vapor, 88 per minute of oxygen, and 352 ml. per minute of nitrogen was introduced at about atmospheric pressure. The catalyst beds were maintained at 300° C., and both the upper and lower beds were substantially uniform in temperature distribution. In about 1 hour after initiation of the reaction, the catalyst activity became stable. Thereafter, the reaction was continued for about 12 hours without regenerating or exchanging the catalyst. The reaction product was passed to a cooling bath comprising dry ice, and the resulting liquid condensate and noncondensate were individually subjected to measurement and to analysis by means of gas chromatography to obtain the following results:

| | |
|---|---|
| Methanol conversion | 27 percent |
| Isoprene selectivity based on methanol | 32 percent |

In addition, 21 percent of the reacted methanol was converted into formaldehyde as a byproduct.

We claim:

1. A process for producing isoprene, which comprises contacting a gaseous mixture of isobutylene, oxygen and at least one compound selected from the group consisting of methanol and methyl ether at temperatures of 100°–500° C. with a solid catalyst comprising oxygen and at least one element selected from the group consisting of tungsten, vanadium, molybdenum, uranium, copper, iron and chromium.

2. A process according to claim 1 wherein the mixed gas is contacted with the solid catalyst in the presence of steam.

3. A process according to claim 1, wherein the mixed gas is contacted with the solid catalyst by use of a fluidized bed reactor.

4. A process according to claim 1 wherein the solid catalyst includes a promotor element selected from the group consisting of phosphorous, sulfur, boron, antimony, bismuth, tellurium, silver, barium, calcium, magnesium, potassium and sodium.

5. A compound according to claim 4 wherein said promoter element is phosphorous.

6. A compound according to claim 4 wherein said promoter element is sulfur.

7. A process according to claim 1 wherein said catalyst includes a compound comprising silicon and oxygen.

8. A process according to claim 7 wherein said compound comprising silicon and oxygen is a solid having a surface area of up to 350 m.$^2$/g.

9. A process according to claim 8 wherein said compound is silica gel.

10. A process for producing isoprene, which comprises contacting a gaseous mixture of isobutylene, oxygen and at least one compound selected from the group consisting of methanol and methyl ether at temperatures of 100°–500° C. with a solid catalyst comprising oxygen and at least one element selected from the group consisting of tungsten, vanadium, molybdenum, uranium, copper, iron and chromium, a promoter element selected from the group consisting of phosphorous and sulfur and a solid compound of silicon and oxygen having a surface area of up to 350 m.$^2$/g.

* * * * *

UNITED STATES PATENT OFFICE
CERTIFICATE OF CORRECTION

Patent No. 3,621,072         Dated  November 16, 1971

Inventor(s)  Yoshihiro Watanabe et al.

It is certified that error appears in the above-identified patent and that said Letters Patent are hereby corrected as shown below:

In [32] Priorities: before "No. 43/35391" (third priority), change "May 5, 1968" to --May 24, 1968--.

In [32] Priorities: insert the following missing priority --May 28, 1968, 43/37345--.

Signed and sealed this 30th day of May 1972.

(SEAL)
Attest:

EDWARD M. FLETCHER, JR.                ROBERT GOTTSCHALK
Attesting Officer                      Commissioner of Patents